(12) United States Patent
Kobayashi et al.

(10) Patent No.: US 12,209,639 B1
(45) Date of Patent: Jan. 28, 2025

(54) PLANETARY GEAR REDUCTION MECHANISM

(71) Applicant: MITSUBA Corporation, Gunma (JP)

(72) Inventors: Motoaki Kobayashi, Gunma (JP); Teppei Tokizaki, Gunma (JP); Tohru Yumoto, Gunma (JP); Nobuyuki Nagai, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 18/605,860

(22) Filed: Mar. 15, 2024

(30) Foreign Application Priority Data

Jul. 24, 2023 (JP) ................................. 2023-119730

(51) Int. Cl.
*F16H 1/34* (2006.01)
*F16H 57/08* (2006.01)

(52) U.S. Cl.
CPC ............. *F16H 1/34* (2013.01); *F16H 57/082* (2013.01); *F16H 2057/085* (2013.01)

(58) Field of Classification Search
CPC ..... F16H 1/34; F16H 57/082; F16H 2057/085
See application file for complete search history.

(56) References Cited

U.S. PATENT DOCUMENTS

| | | | | |
|---|---|---|---|---|
| 2014/0230586 | A1* | 8/2014 | Saxstetter | F16H 25/24 74/89.23 |
| 2018/0347097 | A1* | 12/2018 | Yoneda | D06F 34/08 |
| 2019/0010746 | A1* | 1/2019 | Sakiyama | E05F 15/63 |
| 2021/0388885 | A1* | 12/2021 | Takizawa | F16H 25/20 |
| 2023/0184019 | A1* | 6/2023 | Ta | F16H 1/28 49/349 |

FOREIGN PATENT DOCUMENTS

WO 2021014647 1/2021

\* cited by examiner

*Primary Examiner* — Jacob S. Scott
*Assistant Examiner* — Farhana Pervin
(74) *Attorney, Agent, or Firm* — JCIPRNET

(57) ABSTRACT

A fifth ball bearing that rotatably supports a rotating shaft is provided on one side of a pinion gear in an axial direction of the rotating shaft. A sixth ball bearing that rotatably supports the rotating shaft is provided on the other side of the pinion gear in the axial direction of the rotating shaft. A carrier is provided with a bearing fixing portion that supports the fifth ball bearing immovably in the axial direction of the rotating shaft, and a bearing guide portion that supports the sixth ball bearing movably in the axial direction of the rotating shaft. The fifth and sixth ball bearings are provided so as not to be close to each other in the axial direction of the rotating shaft, and a female screw portion has a rattling adjustment member that presses the sixth ball bearing toward the side where the fifth ball bearing is provided.

6 Claims, 15 Drawing Sheets

PLANETARY GEAR REDUCTION MECHANISM

CROSS-REFERENCE TO RELATED APPLICATION

This application claims the priority benefits of Japanese application no. 2023-119730, filed on Jul. 24, 2023. The entirety of the above-mentioned patent application is hereby incorporated by reference herein and made a part of this specification.

BACKGROUND

Technical Field

The disclosure relates to a planetary gear reduction mechanism including a plurality of gears.

Description of Related Art

For example, Patent Document 1 (International Publication No. 2021/014647) describes a planetary reduction device in which front-stage and rear-stage planetary reduction mechanisms each including a sun gear, a planetary gear, a planetary carrier, and an internal gear are arranged one on top of the other in the axial direction. As a result, the rotational speed of the sun gear of the front-stage planetary reducer is reduced, and a high-torque rotational force is output from the planetary carrier of the rear-stage planetary reducer.

In the technique described in Patent Document 1, a pressurization mechanism is provided in the rear-stage planetary carrier, and the pressurization mechanism is arranged to be stretched between the rear-stage planetary carrier and the front-stage planetary carrier in which the rear-stage sun gear is integrally provided. As a result, the rear-stage sun gear and the rear-stage planetary gear mesh with each other with movement in the axial direction being restricted. However, there is a problem that the front-stage sun gear is not pressurized by the pressurization mechanism, and the front-stage sun gear may rattle in the axial direction or have a rotational shake, resulting in unstable operation.

The disclosure provides a planetary gear reduction mechanism that is capable of stable operation.

SUMMARY

In one aspect of the disclosure, a planetary gear reduction mechanism includes a sun gear provided on a rotating shaft; an internal gear arranged on a radially outer side of the sun gear; a planetary gear arranged between the sun gear and the internal gear; a planetary carrier rotatably supporting the planetary gear; a first bearing provided on one side of the sun gear in an axial direction of the rotating shaft and rotatably supporting the rotating shaft; a second bearing provided on the other side of the sun gear in the axial direction of the rotating shaft and rotatably supporting the rotating shaft; a first bearing support portion provided on the planetary carrier and supporting the first bearing immovably in the axial direction of the rotating shaft; and a second bearing support portion provided on the planetary carrier and supporting the second bearing movably in the axial direction of the rotating shaft. The first bearing and the second bearing are provided so as not to be close to each other in the axial direction of the rotating shaft, and the second bearing support portion includes a pressing member that presses the second bearing toward a side where the first bearing is provided.

According to the disclosure, a planetary gear reduction mechanism that is capable of stable operation is realized.

DESCRIPTION OF THE EMBODIMENTS

One embodiment of the disclosure will be described in detail below with reference to the drawings.

Figure 1:
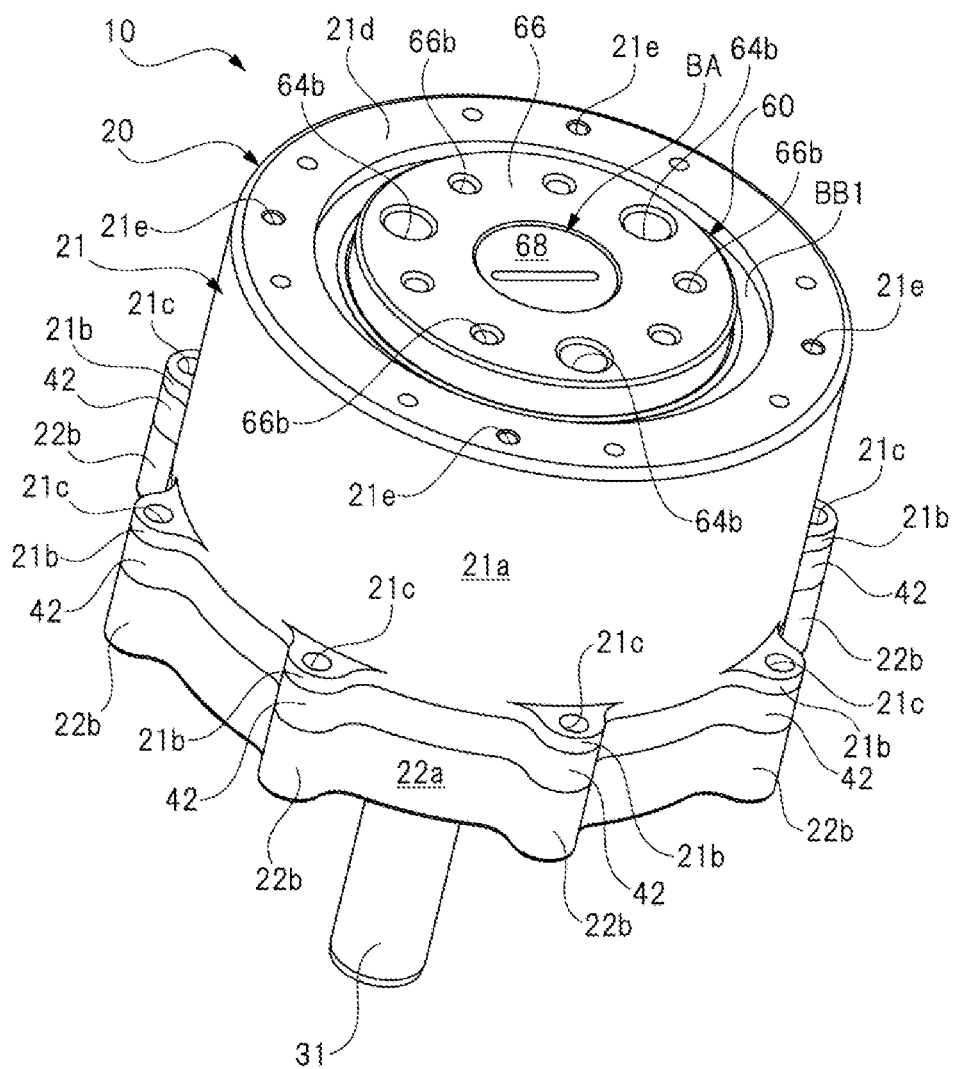
FIG. 1 is a perspective view of the planetary gear reduction mechanism viewed from the output side.
Figure 2:
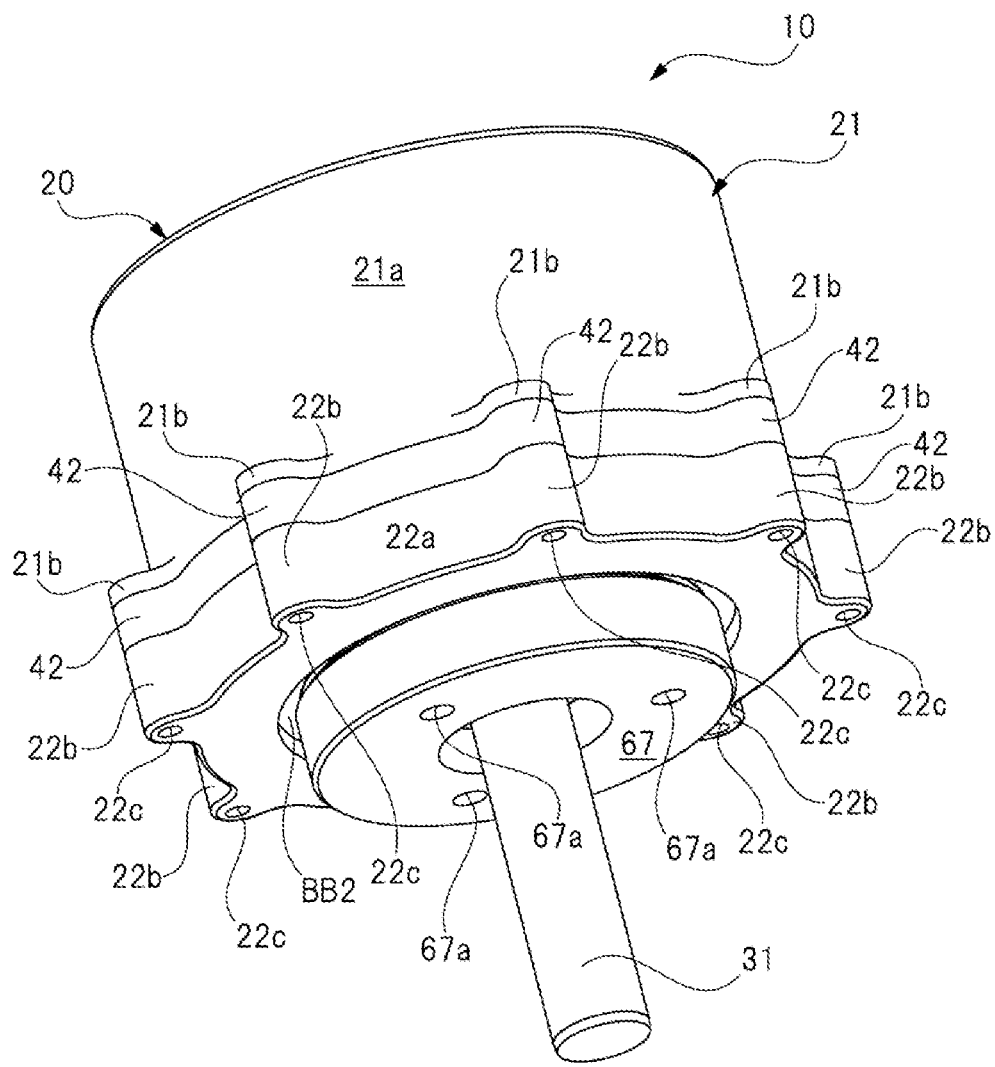
FIG. 2 is a perspective view of the planetary gear reduction mechanism viewed from the input side.
Figure 3:
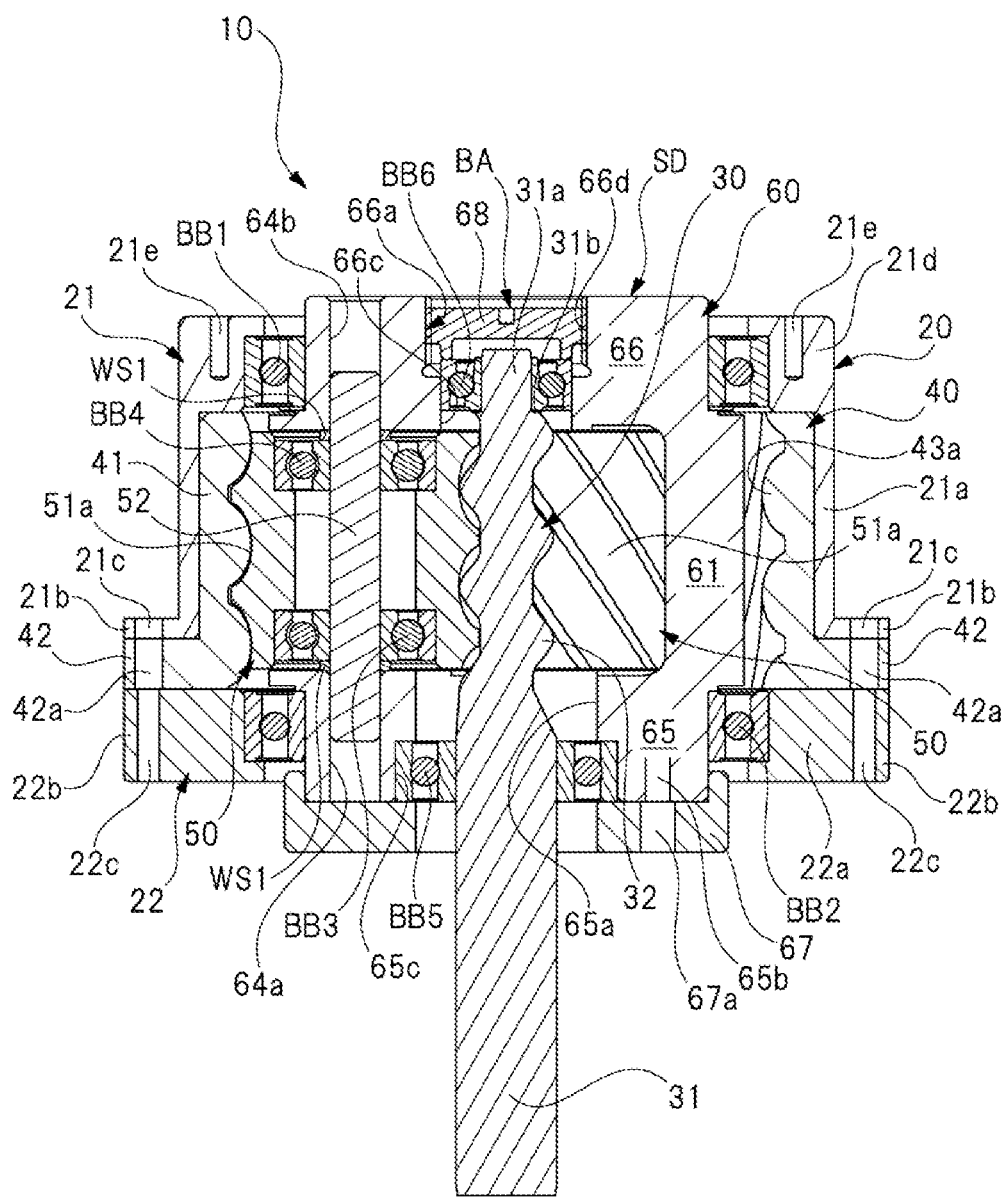
FIG. 3 is a cross-sectional view showing the internal structure of the planetary gear reduction mechanism in FIG. 1.
Figure 4:
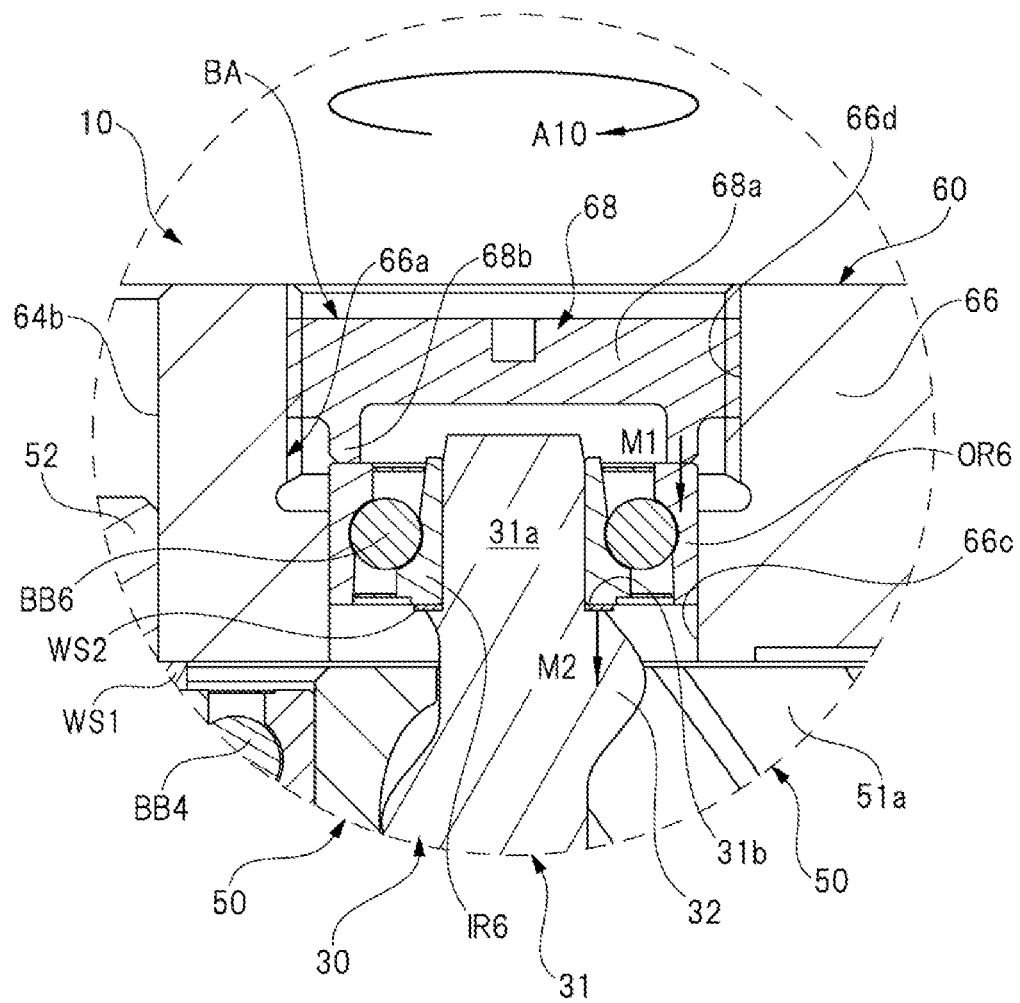
FIG. 4 is an enlarged cross-sectional view of a portion of the rattling adjustment mechanism.
Figure 5:
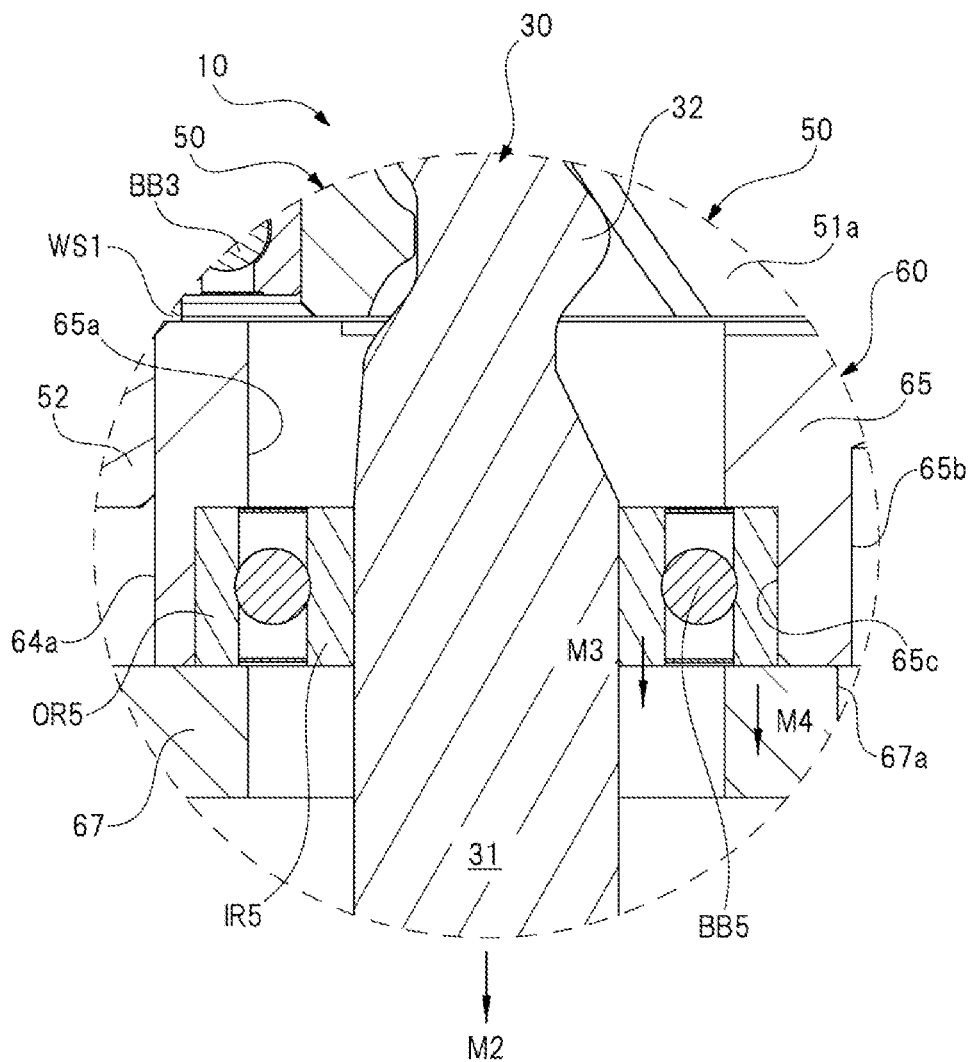
FIG. 5 is an enlarged cross-sectional view of a portion of the fifth ball bearing.
Figure 6:
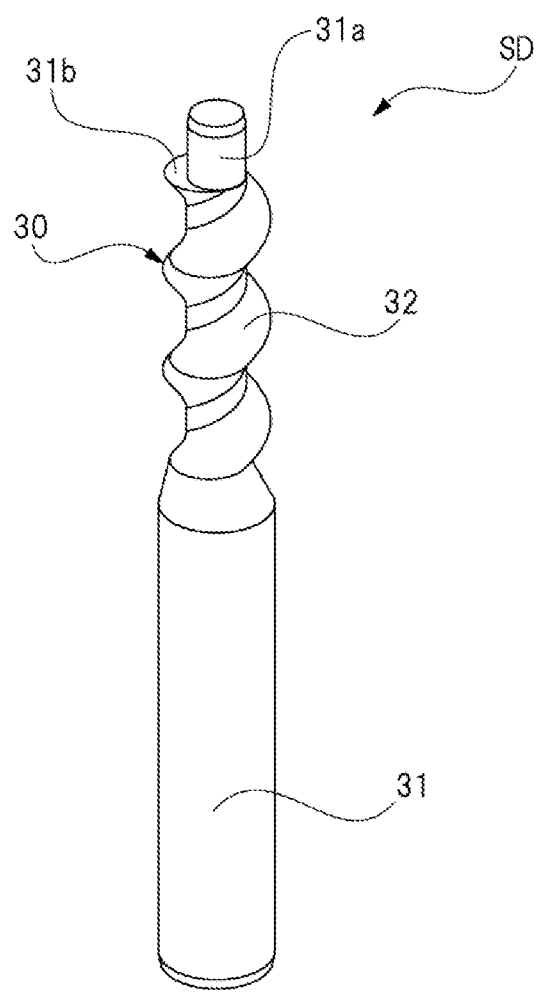
FIG. 6 is a perspective view showing the pinion gear alone.
Figure 7:
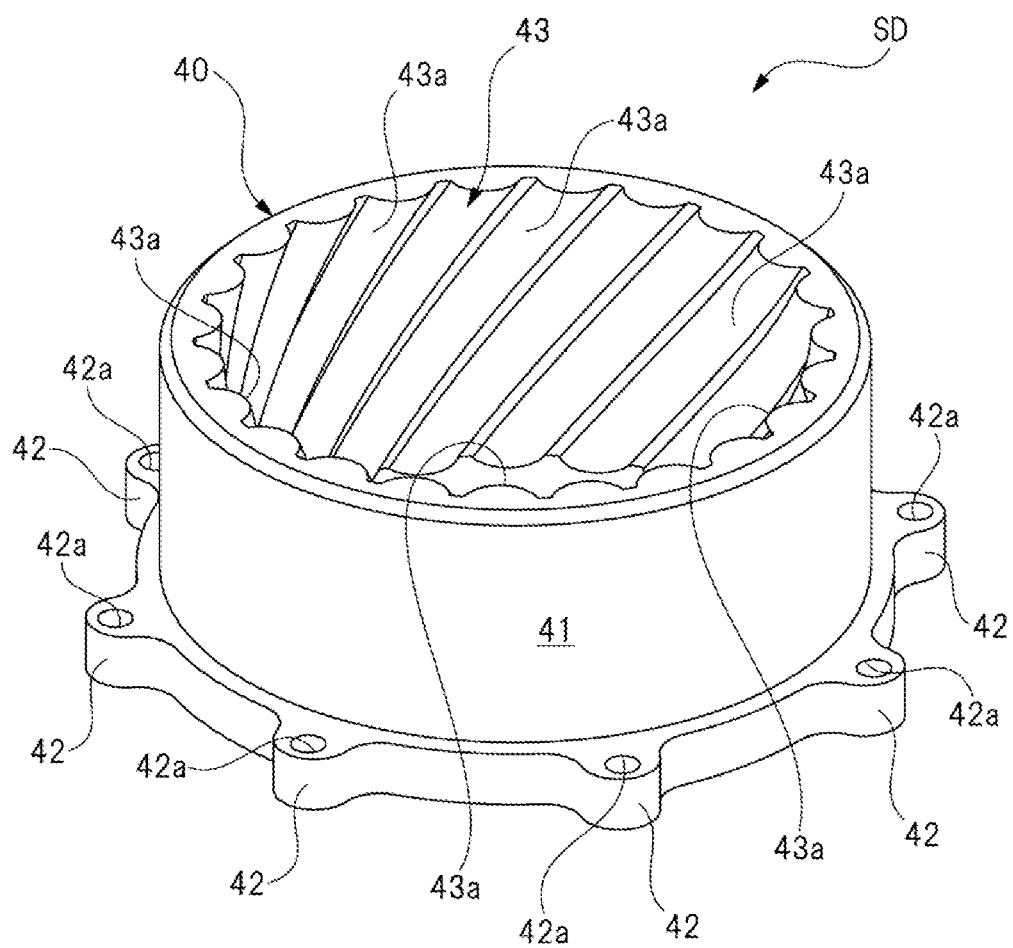
FIG. 7 is a perspective view showing the internal gear alone.
Figure 8:
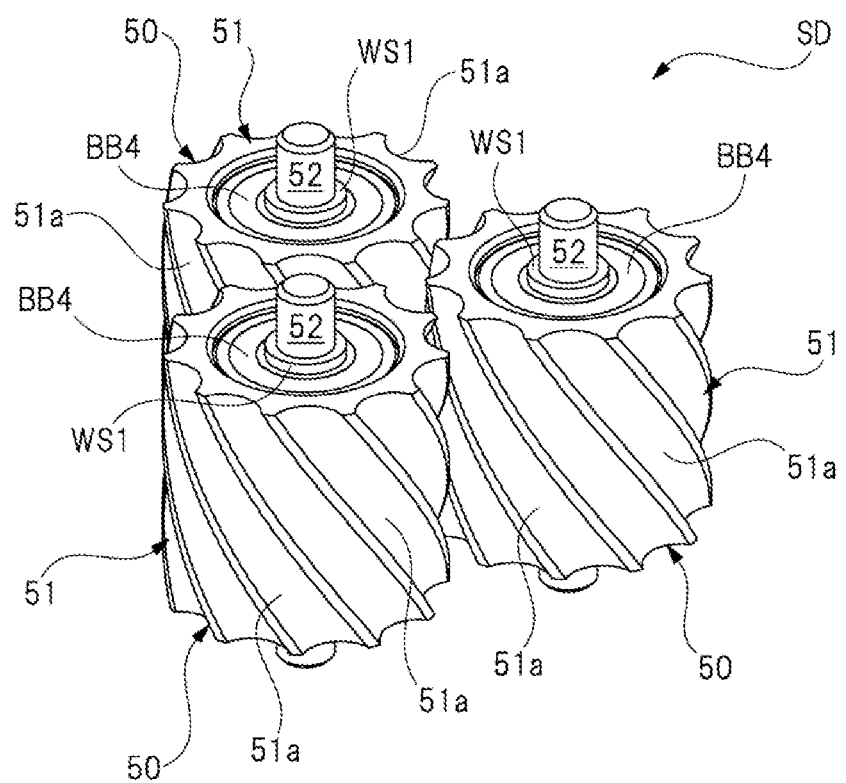
FIG. 8 is a perspective view showing three helical gears.
Figure 9:
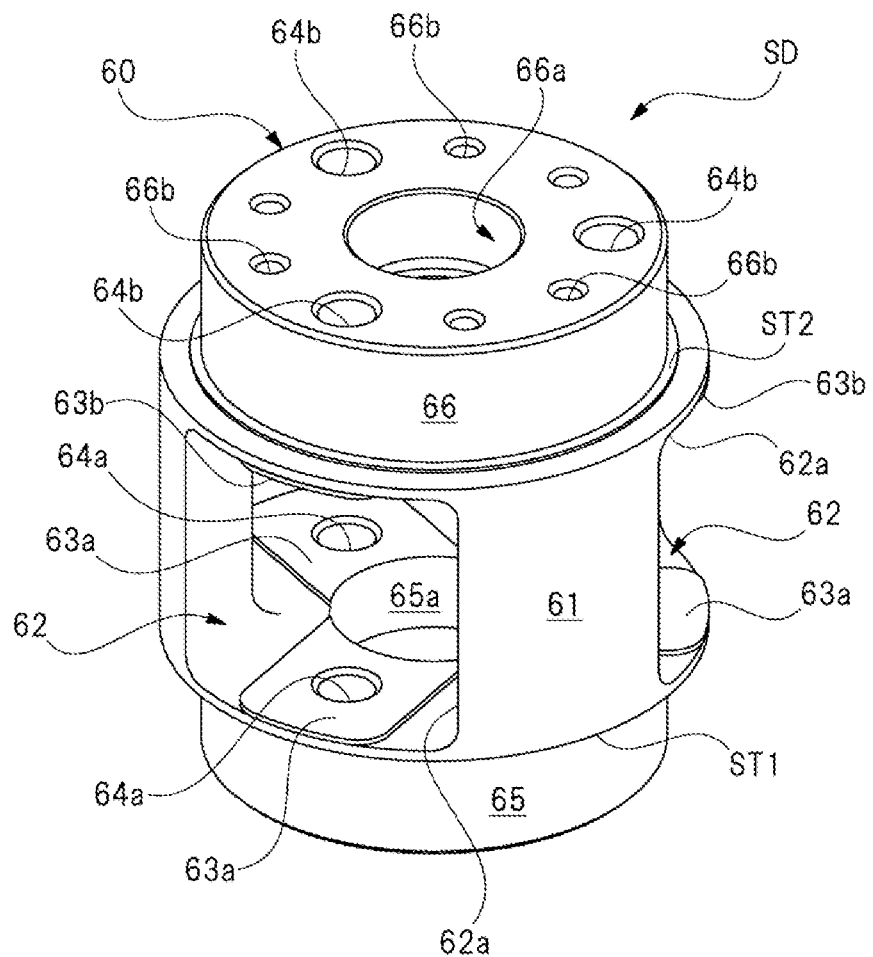
FIG. 9 is a perspective view showing the carrier alone.
Figure 10:
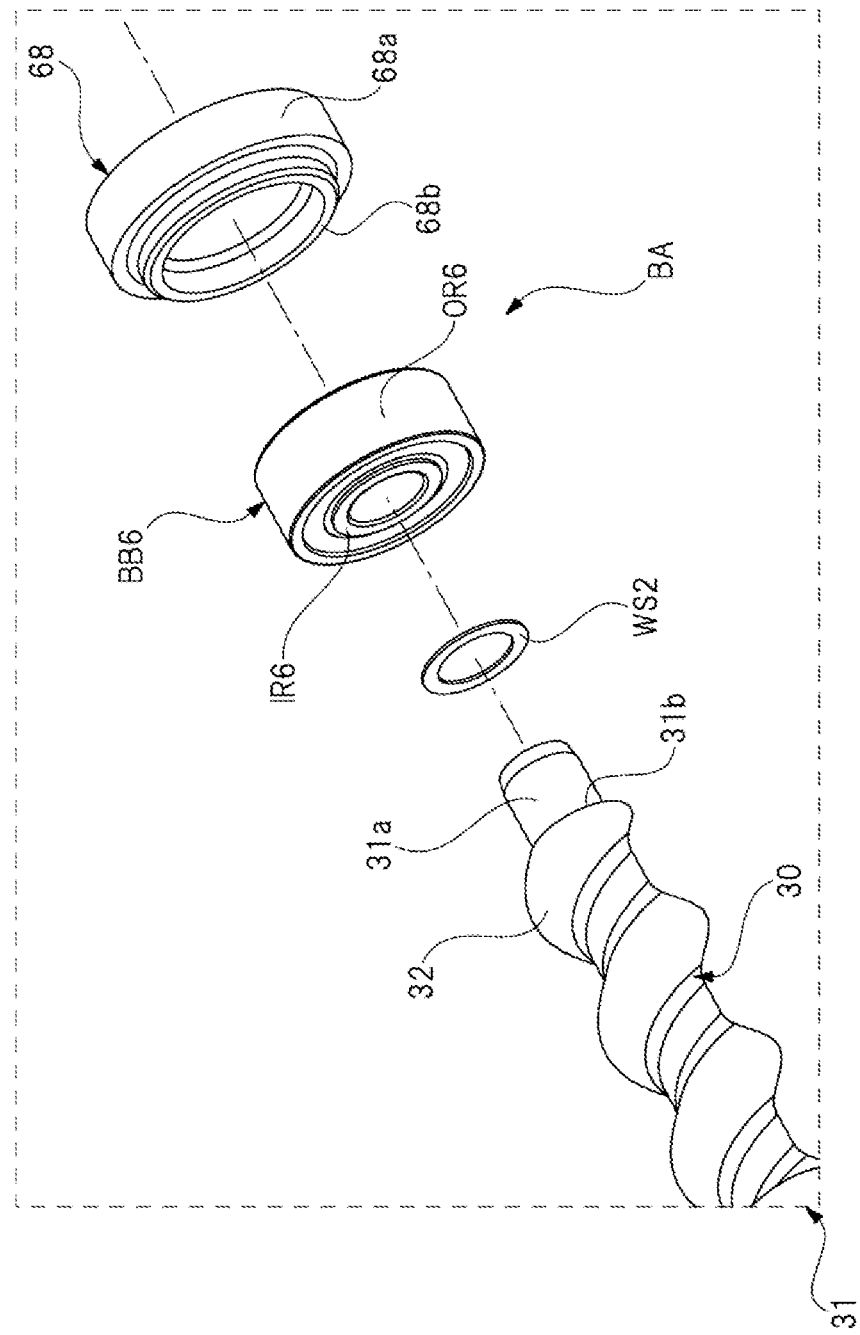
FIG. 10 is an exploded perspective view of the rattling adjustment mechanism.

FIG. 1 is a perspective view of the planetary gear reduction mechanism viewed from the output side, FIG. 2 is a perspective view of the planetary gear reduction mechanism viewed from the input side, FIG. 3 is a cross-sectional view showing the internal structure of the planetary gear reduction mechanism in FIG. 1, FIG. 4 is an enlarged cross-sectional view of a portion of the rattling adjustment mechanism, FIG. 5 is an enlarged cross-sectional view of a portion of the fifth ball bearing, FIG. 6 is a perspective view showing the pinion gear alone, FIG. 7 is a perspective view showing the internal gear alone, FIG. 8 is a perspective view showing three helical gears, FIG. 9 is a perspective view showing the carrier alone, and FIG. 10 is an exploded perspective view of the rattling adjustment mechanism.

[Overview of the Planetary Gear Reduction Mechanism]

A planetary gear reduction mechanism 10 shown in FIG. 1 to FIG. 5 is used, for example, to drive the joints of a robot. Further, an electric motor (not shown), which is a drive source, is provided on the input side (lower side in the drawing) of the planetary gear reduction mechanism 10 so as to be capable of transmitting power, and a drive mechanism (not shown) of a robot, which is an object to be driven, is provided on the output side (upper side in the drawing) of the planetary gear reduction mechanism 10 so as to be capable of transmitting power.

Specifically, a rotating shaft 31 of the planetary gear reduction mechanism 10 is rotated by the electric motor, and a carrier 60 of the planetary gear reduction mechanism 10 drives the drive mechanism of the robot. The planetary gear reduction mechanism 10 then decelerates the rotation of the rotating shaft 31 to increase the torque, and outputs a rotational force with increased torque from the carrier 60.

Thereby, the planetary gear reduction mechanism 10 is capable of transmitting large drive torque to the drive mechanism of the robot even if the drive source is a small electric motor. Thus, the electric motor can be made small and can be easily installed inside a robot arm or the like that has a small installation space.

It should be noted that the planetary gear reduction mechanism 10 according to this embodiment is not limited to use for driving the joints of a robot and can also be applied to, for example, small vehicle-mounted drive systems, e.g. power sliding door devices and power window devices mounted on vehicles such as automobiles.

[Housing]

The planetary gear reduction mechanism 10 includes a housing 20 that forms an outer shell of the planetary gear reduction mechanism 10. The housing 20 includes a housing body 21 that is formed in a substantially cylindrical shape, and a ring member 22 that is mounted on one axial side (lower side in the drawing) of the housing body 21 and is formed in an annular shape. The housing body 21 and the ring member 22 are both made of aluminum, thereby reducing the overall weight of the planetary gear reduction mechanism 10.

The housing body 21 includes a cylindrical portion 21a that extends in the axial direction of the planetary gear reduction mechanism 10, and a total of eight first flange portions 21b that are integrally provided on one axial side of the cylindrical portion 21a and protrude toward the radially outer side of the cylindrical portion 21a. Further, a total of eight first flange portions 21b are each provided with an insertion hole 21c into which a fixing bolt (not shown) is inserted.

On the other hand, an annular second flange portion 21d is integrally provided on the other axial side (upper side in the drawing) of the cylindrical portion 21a so as to protrude toward the radially inner side of the cylindrical portion 21a. Further, the outer ring (outer race) of a first ball bearing BB1 is mounted on the radially inner side of the second flange portion 21d. In addition, one axial side (lower side in the drawing) of the second flange portion 21d supports the other axial side (upper side in the drawing) of an internal gear 40.

Thus, the second flange portion 21d of the housing body 21 has a function of supporting both the first ball bearing BB1 and the internal gear 40.

Here, the first ball bearing BB1 rotatably supports the other axial side (upper side in the drawing) of the carrier 60, and specifically, the inner ring (inner race) of the first ball bearing BB1 is mounted on the outer peripheral portion of an output side cylindrical portion 66 (see FIG. 9) that forms the carrier 60.

Further, a plurality of screw holes 21e are provided on the other axial side (upper side in the drawing) of the second flange portion 21d. Further, fixing screws (not shown) for fixing the planetary gear reduction mechanism 10 to an internal fixing portion (not shown) such as a robot arm are screwed into these screw holes 21e.

The ring member 22 includes an annular body 22a. A total of eight third flange portions 22b are integrally provided on the annular body 22a so as to protrude toward the radially outer side thereof. These third flange portions 22b are provided corresponding to the first flange portions 21b of the housing body 21. Each third flange portion 22b is provided with a female screw hole 22c into which a fixing bolt (not shown) is screwed.

It should be noted that a total of eight fourth flange portions 42 provided on the internal gear 40 are held between the first flange portions 21b and the third flange portions 22b forming the housing 20 in the axial direction of the housing 20. As a result, a fixing bolt (not shown) is inserted into the insertion hole 21c of the first flange portion 21b and an insertion hole 42a of the fourth flange portion 42 and screwed into the female screw hole 22c of the third flange portion 22b, thereby housing and fixing a speed reducer SD inside the housing 20.

Furthermore, the outer ring of a second ball bearing BB2 is mounted on the radially inner side of the ring member 22. That is, the ring member 22 has a function of supporting the second ball bearing BB2 and fixing the internal gear 40 inside the housing 20.

Here, the second ball bearing BB2 rotatably supports one axial side (lower side in the drawing) of the carrier 60, and specifically, the inner ring of the second ball bearing BB2 is mounted on the outer peripheral portion of an input side cylindrical portion 65 (see FIG. 9) that forms the carrier 60.

In addition, a total of four positioning protrusions P (see FIG. 13) are integrally provided on the other axial side (upper side in the drawing) of the ring member 22. These positioning protrusions P protrude toward the internal gear 40 in the axial direction of the ring member 22, and are engaged with engagement recesses (not shown) of the internal gear 40. Thereby, the ring member 22 can be easily positioned with respect to the internal gear 40 (improved assemblability).

It should be noted that the first ball bearing BB1 and the second ball bearing BB2 that respectively support both axial sides of the carrier 60 are ball bearings of the same size and specifications. Moreover, the first and second ball bearings BB1 and BB2 are the largest ball bearings among the ball bearings provided in the planetary gear reduction mechanism 10.

[Overview of the Speed Reducer]

As shown in FIG. 3 to FIG. 9, the planetary gear reduction mechanism 10 includes a plurality of gears. Specifically, the speed reducer SD housed inside the housing 20 includes one pinion gear 30, one internal gear 40, a total of three planetary gears 50, and the carrier 60 that holds these planetary gears 50. In other words, the speed reducer SD is a planetary speed reducer.

[Pinion Gear]

As shown in FIG. 3 to FIG. 6, the pinion gear 30 is integrally provided on the other axial side (upper side in the drawing) of the rotating shaft 31. Further, an output shaft (not shown) of the electric motor serving as a drive source is connected to one axial side (lower side in the drawing) of the rotating shaft 31 so as to be capable of transmitting power. As a result, the pinion gear 30 is rotated in a predetermined rotation direction at a predetermined rotational speed as the electric motor rotates.

It should be noted that the pinion gear 30 corresponds to the sun gear in the disclosure.

A spiral tooth 32 is integrally provided on the outer peripheral portion of the pinion gear 30. The axial length of the pinion gear 30 (spiral tooth 32) is slightly greater than the axial length of the planetary gear 50. Thereby, the spiral tooth 32 can reliably mesh with the planetary gear 50.

It should be noted that the spiral tooth 32 corresponds to one tooth in the disclosure.

The spiral tooth 32 is spirally connected in the axial direction of the rotating shaft 31, and the pinion gear 30 is provided with only one spiral tooth 32. That is, the number of teeth of the pinion gear 30 is "1". Further, the cross-sectional shape of the spiral tooth 32 is substantially semicircular, and the spiral tooth 32 fits into (meshes with) a meshing recess 51a (see FIG. 8) of the planetary gear 50.

By setting the number of teeth of the pinion gear 30 to "1" in this way, the transmission efficiency [%] of the gears is increased and a large reduction ratio is obtained despite the small size. Therefore, it is possible to downsize and save power of the electric motor which is a drive source.

[Internal Gear]

As shown in FIG. 3 and FIG. 7, the internal gear 40 is fixed to the radially inner side of the cylindrical portion 21a that forms the housing body 21. Specifically, the internal gear 40 is held by the housing body 21 and the ring member 22 in the axial direction of the planetary gear reduction mechanism 10. Further, the internal gear 40 includes a cylindrical body 41 that is formed in a substantially cylindrical shape, and a total of eight fourth flange portions 42 that protrude toward the radially outer side of the cylindrical body 41 on one axial side of the cylindrical body 41.

The cylindrical body 41 is arranged on the radially outer side of the pinion gear 30, and a gear forming portion 43 is provided on the radially inner side of the cylindrical body 41. The gear forming portion 43 of the cylindrical body 41 is integrally provided with a plurality of internal teeth 43a having a substantially semicircular cross-sectional shape, similar to the spiral tooth 32 of the pinion gear 30. Here, the plurality of internal teeth 43a are inclined at a predetermined angle with respect to the axial direction of the cylindrical body 41 so as to mesh with the meshing recesses 51a (see FIG. 8) of the planetary gear 50.

It should be noted that the internal gear 40 corresponds to the internal gear in the disclosure.

In addition, the fourth flange portions 42 provided on the internal gear 40 are provided corresponding to the first flange portions 21b of the housing body 21 and the third flange portions 22b of the ring member 22. Further, a total of eight fourth flange portions 42 are each provided with an insertion hole 42a into which a fixing bolt (not shown) is inserted.

Thereby, the fourth flange portions 42 are held between the first flange portions 21b and the third flange portions 22b, and consequently, the internal gear 40 is securely fixed without rattling in both the axial direction and the circumferential direction of the housing 20.

[Planetary Gear]

As shown in FIG. 3 and FIG. 8, a total of three planetary gears 50 are arranged between the pinion gear 30 and the internal gear 40 in the radial direction of the planetary gear reduction mechanism 10. The planetary gears 50 are arranged at equal intervals (120 degree intervals) with respect to the circumferential direction of the pinion gear 30 and the internal gear 40, and mesh with both the pinion gear 30 and the internal gear 40.

It should be noted that the planetary gear 50 corresponds to the planetary gear in the disclosure.

The planetary gear 50 is formed in a substantially cylindrical shape, and a gear forming portion 51 is provided on the radially outer side thereof. A plurality of meshing recesses 51a are provided in the gear forming portion 51 of the planetary gear 50 side by side in the circumferential direction. These meshing recesses 51a are inclined at a predetermined angle with respect to the axial direction of the planetary gear 50, and as a result, the spiral tooth 32 of the pinion gear 30 and the internal teeth 43a of the internal gear 40 can fit into and mesh with the meshing recesses 51a.

Here, the planetary gear 50 has the meshing recesses 51a that are inclined with respect to the axial direction of the planetary gear 50, and can also be called a helical gear.

Thus, each planetary gear 50 is rolled between the pinion gear 30 rotated by the electric motor (not shown) and the internal gear 40 fixed to the housing 20. It should be noted that the meshing recess 51a of the planetary gear 50 is recessed with a substantially semicircular cross-sectional shape.

A third ball bearing BB3 and a fourth ball bearing BB4 are provided on the radially inner side of the planetary gear 50. Specifically, the third ball bearing BB3 is arranged on one axial side (lower side in the drawing) of the planetary gear 50, and the fourth ball bearing BB4 is arranged on the other axial side (upper side in the drawing) of the planetary gear 50. Further, the outer rings of the third and fourth ball bearings BB3 and BB4 are mounted on the radially inner side of the planetary gear 50.

It should be noted that the third ball bearing BB3 and the fourth ball bearing BB4 provided on both axial sides of the planetary gear 50 rotatably support the planetary gear 50, respectively, and correspond to the ball bearings in the disclosure.

These third and fourth ball bearings BB3 and BB4 are ball bearings of the same size and specifications, respectively. In addition, the third and fourth ball bearings BB3 and BB4 are ball bearings smaller than the first and second ball bearings BB1 and BB2 that rotatably support the carrier 60.

A total of three planetary gears 50 are rotatably supported by support shafts 52, respectively. Specifically, the support shafts 52 are inserted into the inner rings of the third and fourth ball bearings BB3 and BB4 mounted on the planetary gears 50 when assembling a carrier assembly CA (see FIG. 12). Further, both axial sides of the support shaft 52 are fixed to first and second support shaft fixing holes 64a and 64b provided in the carrier 60, respectively.

It should be noted that first washers WS1 are provided on one axial side of the third ball bearing BB3 (lower side in the drawing) and on the other axial side of the fourth ball bearing BB4 (upper side in the drawing). As a result, the planetary gear 50 on which the third and fourth ball bearings BB3 and BB4 are mounted can rotate smoothly with respect to the carrier 60 and the support shaft 52 without rattling.

[Carrier]

As shown in FIG. 3 and FIG. 9, the carrier 60 is formed in a substantially cylindrical shape by cutting an aluminum material. The carrier 60 includes a cylindrical body portion 61, and a total of three gear support portions 62 are provided in the cylindrical body portion 61. Each gear support portion 62 has a function of rotatably supporting the planetary gear 50.

Here, the carrier 60 rotatably supports a total of three planetary gears 50, and corresponds to the planetary carrier in the disclosure.

The gear support portions 62 are provided at equal intervals (120 degree intervals) in the circumferential direction of the cylindrical body portion 61, and include communication holes 62a that communicate the radially inner side and the radially outer side of the cylindrical body portion 61. The communication hole 62a is formed in a substantially square shape when the carrier 60 is viewed from a side. Further, the planetary gear 50 is rotatably housed in the communication hole 62a with a small gap therebetween.

It should be noted that the carrier 60 is one of the components that require particularly high processing accuracy among the components forming the planetary gear reduction mechanism 10 in order to rotate the planetary gears 50 smoothly without rattling.

Furthermore, first and second pedestals 63a and 63b are provided on both sides of the communication holes 62a in the axial direction of the carrier 60 to support both axial sides of the planetary gears 50. Specifically, the first pedestal 63a is arranged on one axial side of the carrier 60 (lower side in the drawing), and the second pedestal 63b is arranged on the other axial side of the carrier 60 (upper side in the drawing).

Further, the first washers WS1 respectively provided on both axial sides of the planetary gears 50 are in contact with the first and second pedestals 63a and 63b, respectively. Thereby, the planetary gears 50 can rotate smoothly without rattling in the axial direction of the carrier 60.

The input side cylindrical portion 65 having a smaller diameter than the cylindrical body portion 61 is provided on one axial side of the carrier 60. An insertion hole 65a through which the rotating shaft 31 (pinion gear 30) is inserted is provided on the radially inner side of the input side cylindrical portion 65, and a fifth ball bearing BB5 that rotatably supports the rotating shaft 31 is fixed into the insertion hole 65a.

Specifically, as shown in FIG. 5, the insertion hole 65a is provided with a bearing fixing portion 65c formed in a stepped shape. In addition, the fifth ball bearing BB5 includes an inner ring IR5 and an outer ring OR5. The outer ring OR5 of the fifth ball bearing BB5 is supported by the bearing fixing portion 65c of the insertion hole 65a.

On the other hand, the inner ring IR5 of the fifth ball bearing BB5 is fixed to the substantially central portion of the rotating shaft 31 in the axial direction (near the pinion gear 30) by press fitting. That is, the fifth ball bearing BB5 is immovable with respect to the rotating shaft 31 on both one axial side and the other axial side of the rotating shaft 31.

Furthermore, as shown in FIG. 3 and FIG. 5, one axial side of the input side cylindrical portion 65 is covered with a lid member 67 formed in a substantially annular shape. The lid member 67 presses the outer ring OR5 of the fifth ball bearing BB5 and prevents the fifth ball bearing BB5 from falling off from the input side cylindrical portion 65. In other words, the lid member 67 prevents the rotating shaft 31 to which the fifth ball bearing BB5 is fixed from coming out of the carrier 60.

Here, the bearing fixing portion 65c supports the fifth ball bearing BB5 immovably in the axial direction of the rotating shaft 31 in cooperation with the lid member 67, and corresponds to the first bearing support portion in the disclosure.

Further, a total of three screw insertion holes 67a (see FIG. 2 and FIG. 14) are provided in the lid member 67, and a total of three screw holes 65b are provided on one axial side of the input side cylindrical portion 65. Then, fixing screws (not shown) for fixing the lid member 67 to the input side cylindrical portion 65 are screwed into a total of three screw holes 65b.

It should be noted that the fifth ball bearing BB5 is provided on one side (lower side in the drawing) of the pinion gear 30 in the axial direction of the rotating shaft 31, and corresponds to the first bearing in the disclosure. Besides, the inner ring IR5 of the fifth ball bearing BB5 corresponds to the first inner ring in the disclosure, and the outer ring OR5 of the fifth ball bearing BB5 corresponds to the first outer ring in the disclosure.

In addition, the inner ring of the second ball bearing BB2 is mounted on the radially outer side of the input side cylindrical portion 65, and the inner ring of the second ball bearing BB2 is abutted against a first stepped portion ST1 (see FIG. 9) between the cylindrical body portion 61 and the input side cylindrical portion 65 from one axial side.

Furthermore, the first support shaft fixing hole 64a is provided at a location of the input side cylindrical portion 65 where the first pedestal 63a is provided so as to extend in the axial direction of the carrier 60. Three first support shaft fixing holes 64a are provided corresponding to the first pedestals 63a, and are arranged at equal intervals (120 degree intervals) in the circumferential direction of the cylindrical body portion 61. Further, the first support shaft fixing hole 64a passes through both the first pedestal 63a and the input side cylindrical portion 65, and one axial side (lower side in the drawing) of the support shaft 52 that rotatably supports the planetary gear 50 is installed in the first support shaft fixing hole 64a.

Further, the output side cylindrical portion 66 having the same diameter as the input side cylindrical portion 65 is provided on the other axial side of the carrier 60. A bearing support portion 66a is provided on the radially inner side of the output side cylindrical portion 66 so as to pass through the output side cylindrical portion 66. The bearing support portion 66a has a bearing guide portion 66c and a female screw portion 66d, as shown in FIG. 4. The bearing guide portion 66c is arranged on one axial side (lower side in the drawing) of the bearing support portion 66a, and the female screw portion 66d is arranged on the other axial side (upper side in the drawing) of the bearing support portion 66a.

Further, a sixth ball bearing BB6 that rotatably supports the other axial side of the rotating shaft 31 is mounted on the bearing guide portion 66c, and the sixth ball bearing BB6 is movable in the axial direction with respect to the bearing guide portion 66c. That is, the bearing guide portion 66c of the bearing support portion 66a supports the sixth ball bearing BB6 to be movable in the axial direction of the rotating shaft 31.

It should be noted that the bearing guide portion 66c forming the bearing support portion 66a corresponds to the second bearing support portion in the disclosure.

Furthermore, a rattling adjustment member 68 for adjusting the rattling in the axial direction of the rotating shaft 31 with respect to the carrier 60 (removing rattling) is provided in the female screw portion 66d of the bearing support portion 66a. Specifically, the rattling adjustment member 68 is screwed to the female screw portion 66d. In this way, a rattling adjustment mechanism BA for removing rattling of the rotating shaft 31 is installed in the carrier 60.

It should be noted that the female screw portion 66d forming the bearing support portion 66a also corresponds to the second bearing support portion in the disclosure.

Further, the second support shaft fixing hole 64b is provided at a location of the output side cylindrical portion 66 where the second pedestal 63b is provided so as to extend in the axial direction of the carrier 60. Three second support shaft fixing holes 64b are provided corresponding to the second pedestals 63b, and are arranged at equal intervals (120 degree intervals) in the circumferential direction of the cylindrical body portion 61. Further, the second support shaft fixing hole 64b passes through both the second pedestal 63b and the output side cylindrical portion 66, and the other axial side (upper side in the drawing) of the support shaft 52 that rotatably supports the planetary gear 50 is installed in the second support shaft fixing hole 64*b*.

Here, the support shaft 52 is inserted into the first support shaft fixing hole 64*a* without rattling, and is fixed into the second support shaft fixing hole 64*b* by press fitting. As a result, the load of inserting the support shaft 52 into the first and second support shaft fixing holes 64*a* and 64*b* when assembling the carrier assembly CA (see FIG. 13) is reduced, thereby improving the assemblability.

In addition, as shown in FIG. 9, a plurality of female screw holes 66*b* are provided on the other axial side (upper side in the drawing) of the output side cylindrical portion 66. These female screw holes 66*b* extend in the axial direction of the carrier 60. Further, a fixing screw (not shown) for fixing the drive mechanism (not shown) of the robot, which is the object to be driven, is screwed into the female screw hole 66*b*.

Furthermore, the inner ring of the first ball bearing BB1 is mounted on the radially outer side of the output side cylindrical portion 66, and the inner ring of the first ball bearing BB1 is abutted against a second stepped portion ST2 (see FIG. 9) between the cylindrical body portion 61 and the output side cylindrical portion 66 from the other axial side. Specifically, a third washer WS3 (see FIG. 13) is provided between the inner ring of the first ball bearing BB1 and the second stepped portion ST2, and the inner ring of the first ball bearing BB1 is abutted against the second stepped portion ST2 via the third washer WS3.

[Rattling Adjustment Mechanism]

As shown in FIG. 3, FIG. 4, and FIG. 10, the rattling adjustment mechanism BA provided in the output side cylindrical portion 66 includes the second washer WS2, the sixth ball bearing BB6, and the rattling adjustment member 68.

The sixth ball bearing BB6 includes an inner ring IR6 and an outer ring OR6. Further, the outer ring OR6 of the sixth ball bearing BB6 is installed in the bearing guide portion 66*c* that forms the bearing support portion 66*a*. Thereby, the sixth ball bearing BB6 is movable in the axial direction with respect to the bearing support portion 66*a*.

On the other hand, the inner ring IR6 of the sixth ball bearing BB6 is mounted on a bearing mounting portion 31*a* provided on the other axial side of the rotating shaft 31 (upper side in FIG. 4). Here, as shown in FIG. 6, the bearing mounting portion 31*a* has a columnar shape with a smaller diameter than the body portion of the rotating shaft 31, and a support step 31*b* is provided between the bearing mounting portion 31*a* and the pinion gear 30.

Further, one axial side of the inner ring IR6 is abutted against the support step 31*b* from the other axial side via the second washer WS2. That is, one axial side of the inner ring IR6 is supported by the support step 31*b* via the second washer WS2. Thereby, the sixth ball bearing BB6 is immovable to one axial side of the rotating shaft 31 with respect to the rotating shaft 31.

In this way, the fifth ball bearing BB5 and the sixth ball bearing BB6 are provided so as not to be close to each other in the axial direction of the rotating shaft 31.

It should be noted that the support step 31*b* corresponds to the step portion in the disclosure.

Moreover, the second washer WS2 has a function of eliminating rattling between the inner ring IR6 of the sixth ball bearing BB6 and the pinion gear 30, and rotating the pinion gear 30 (rotating shaft 31) smoothly.

Here, an angular ball bearing is adopted as the sixth ball bearing BB6. Thereby, the sixth ball bearing BB6 presses the rotating shaft 31 to one axial side (lower side in the drawing) while receiving the axial force from the rattling adjustment member 68. As a result, the rotating shaft 31 is prevented from rattling with respect to the carrier 60. Therefore, the pinion gear 30 and the planetary gear 50 are properly meshed, and the transmission efficiency [%] of these gears is improved. Thus, the quietness during operation of the planetary gear reduction mechanism 10 is improved.

It should be noted that the sixth ball bearing BB6 is provided on the other side (upper side in the drawing) of the pinion gear 30 in the axial direction of the rotating shaft 31, and corresponds to the second bearing in the disclosure. Additionally, the inner ring IR6 of the sixth ball bearing BB6 corresponds to the second inner ring in the disclosure, and the outer ring OR6 of the sixth ball bearing BB6 corresponds to the second outer ring in the disclosure.

Here, the rattling adjustment member 68 includes an adjustment body portion 68*a* formed in a substantially disk shape, and a cylindrical pressing portion 68*b* provided integrally on one axial side (the side of the sixth ball bearing BB6) of the adjustment body portion 68*a*.

Then, by turning the adjustment body portion 68*a* clockwise (in the direction of the arrow A10) with respect to the female screw hole 66*b*, the rattling adjustment member 68 moves to one axial side (lower side in FIG. 4). As a result, the pressing portion 68*b* that contacts the outer ring OR6 of the sixth ball bearing BB6 presses the outer ring OR6 toward one axial side. In contrast thereto, by turning the adjustment body portion 68*a* counterclockwise (in the direction opposite to the direction of the arrow A10) with respect to the female screw hole 66*b*, the rattling adjustment member 68 moves to the other axial side (upper side in FIG. 4).

In this way, the other axial side of the outer ring OR6 of the sixth ball bearing BB6 is supported by the pressing portion 68*b* of the rattling adjustment member 68. It should be noted that the rattling adjustment member 68 is provided on the female screw portion 66*d* of the bearing support portion 66*a* and presses the sixth ball bearing BB6 toward the side where the fifth ball bearing BB5 is provided, and corresponds to the pressing member in the disclosure.

[Assembling Procedure]

Next, the procedure for assembling the planetary gear reduction mechanism 10 formed as described above will be described in detail using FIG. 11 to FIG. 15.

Figure 11:
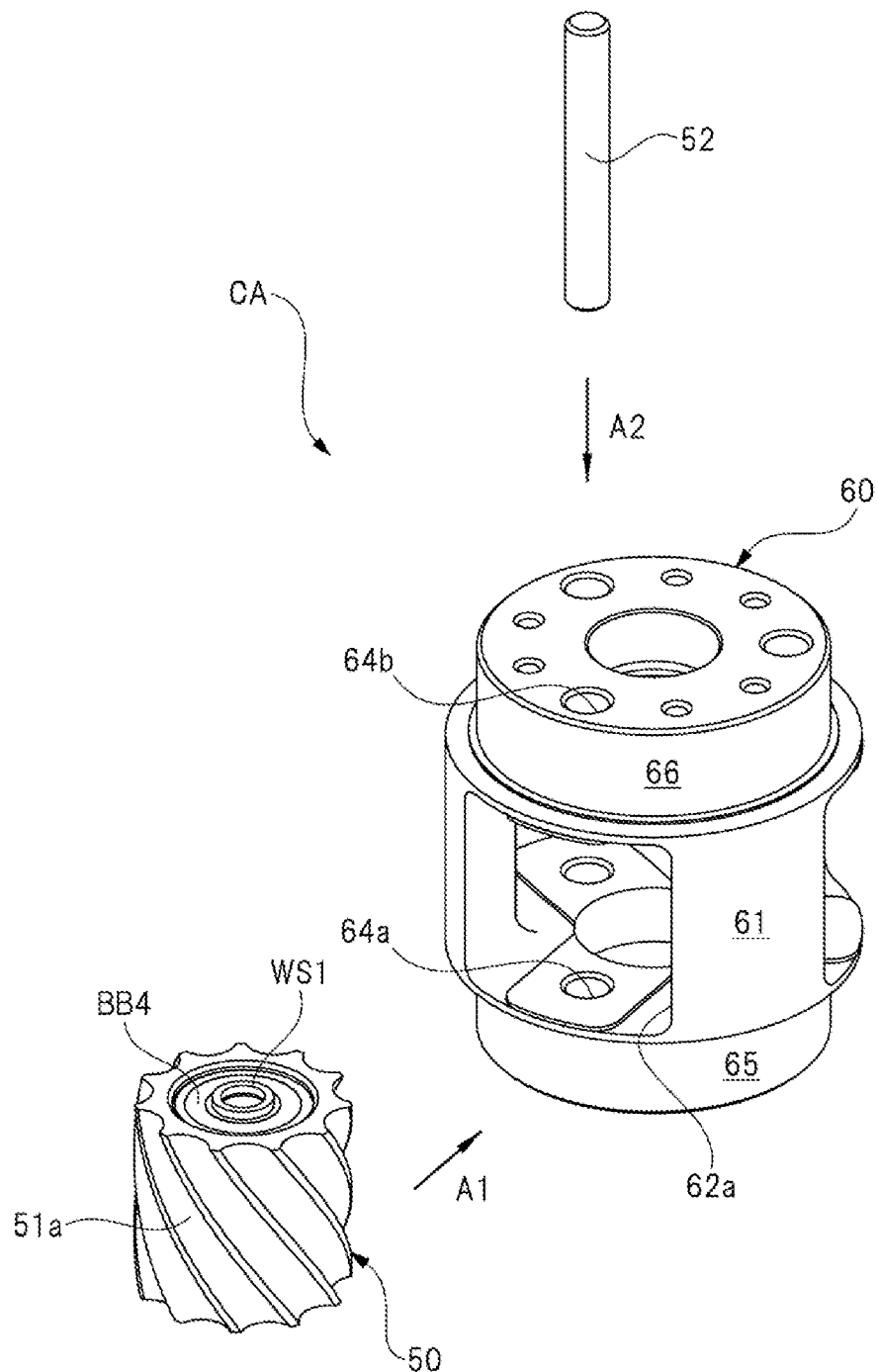
FIG. 11 is a perspective view showing the procedure for assembling the carrier assembly.
Figure 12:
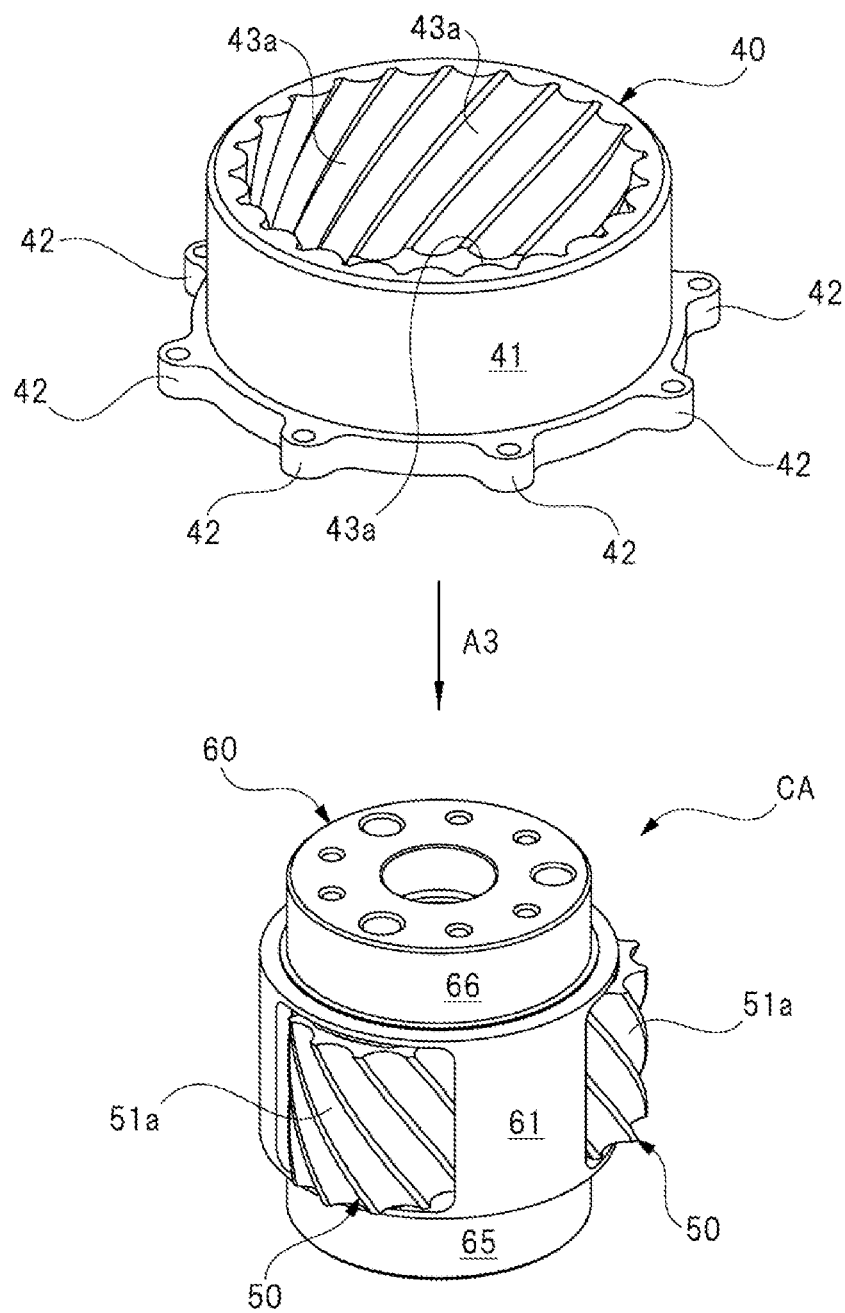
FIG. 12 is a perspective view showing the procedure for assembling the internal gear to the carrier assembly.
Figure 13:
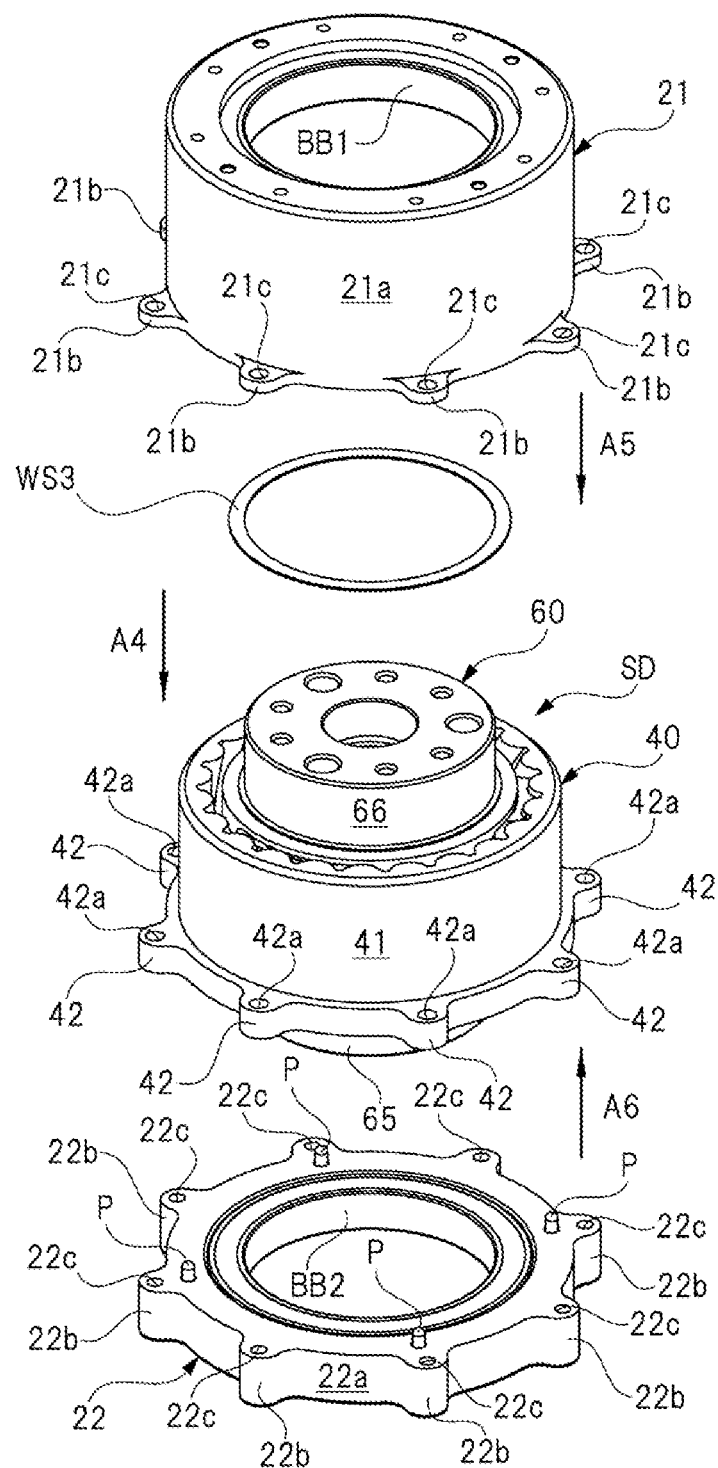
FIG. 13 is a perspective view showing the procedure for assembling the housing body and the ring member.
Figure 14:
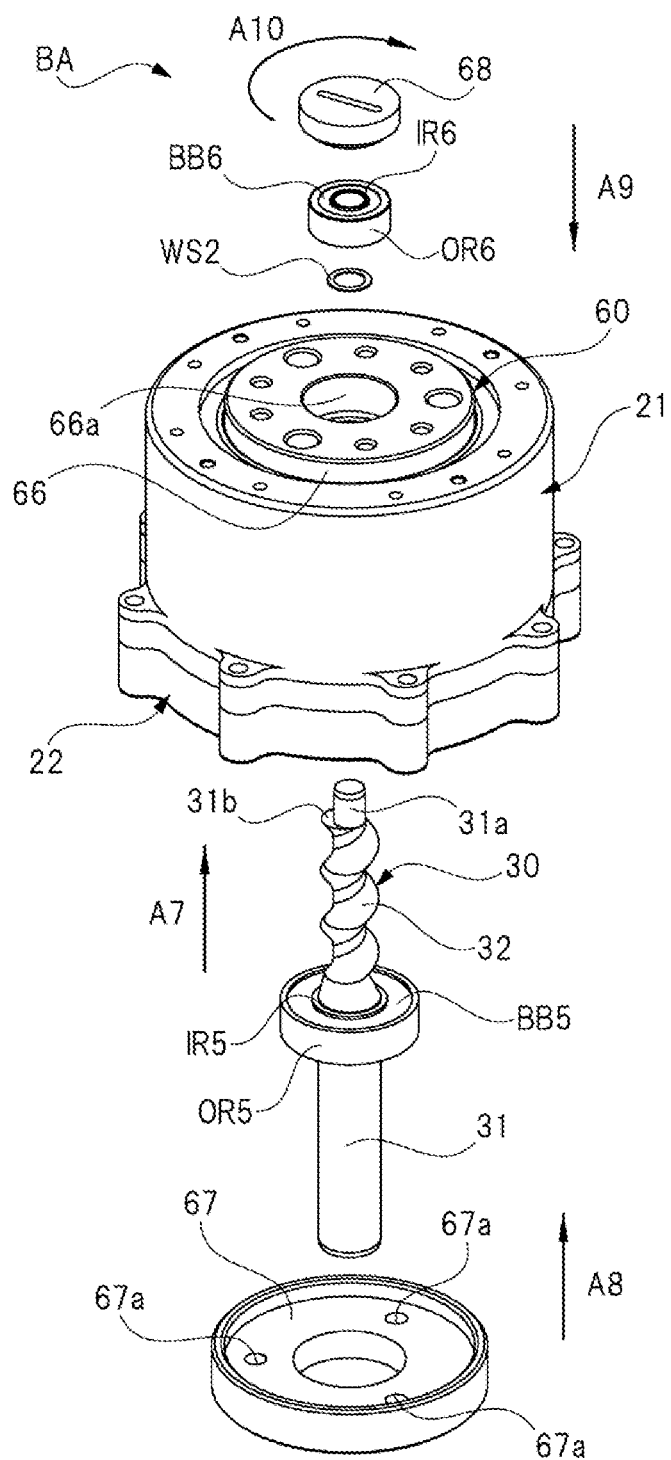
FIG. 14 is a perspective view showing the procedure for assembling the pinion gear and the rattling adjustment mechanism.
Figure 15:
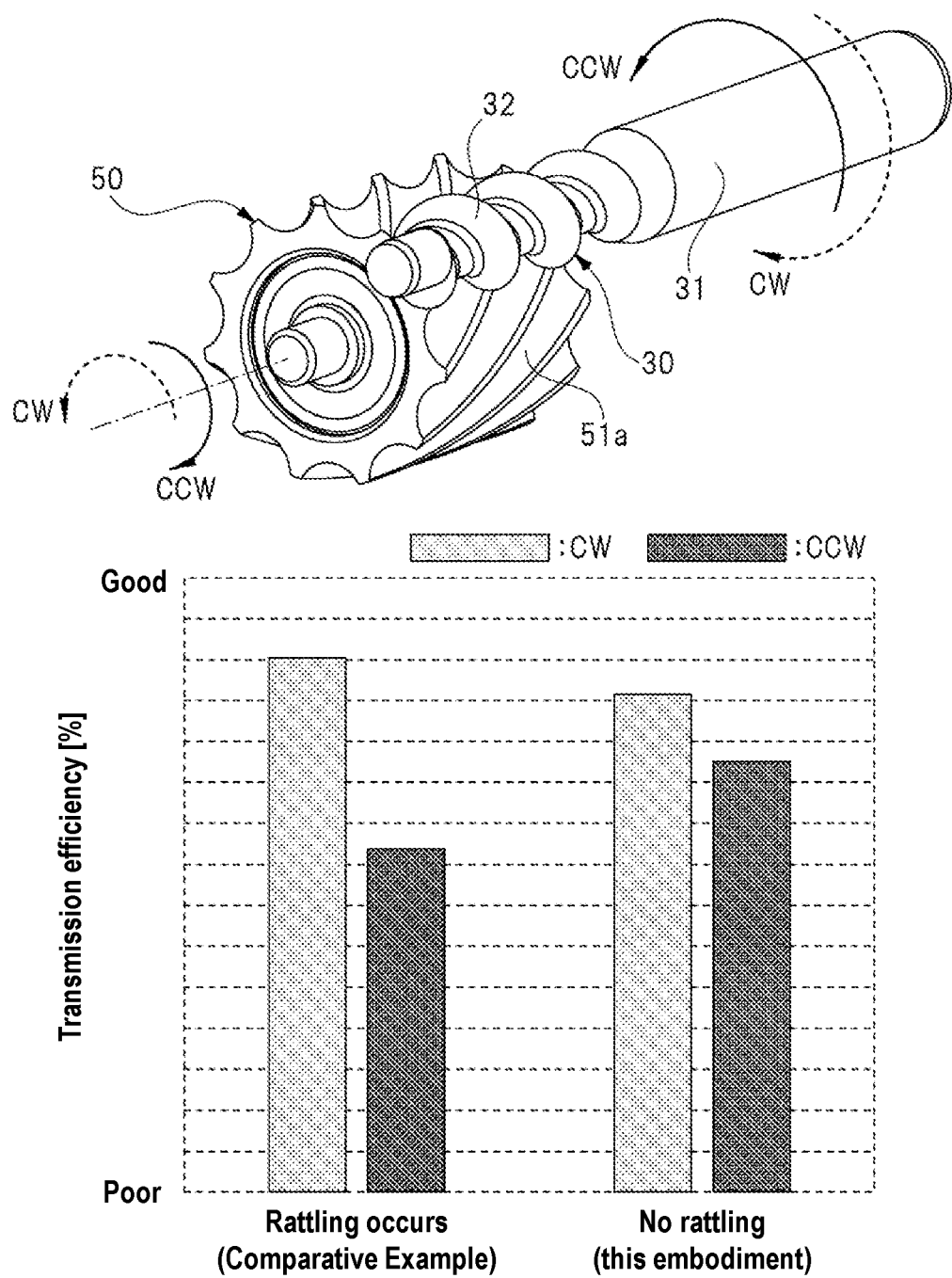
FIG. 15 is a diagram comparing the transmission efficiency [%] of the gears.

FIG. 11 is a perspective view showing the procedure for assembling the carrier assembly, FIG. 12 is a perspective view showing the procedure for assembling the internal gear to the carrier assembly, FIG. 13 is a perspective view showing the procedure for assembling the housing body and the ring member, FIG. 14 is a perspective view showing the procedure for assembling the pinion gear and the rattling adjustment mechanism, and FIG. 15 is a diagram comparing the transmission efficiency [%] of the gears.

[Assembling of the Carrier Assembly]

As shown in FIG. 11, first, the carrier assembly CA is assembled. Specifically, the carrier 60, a total of three planetary gears 50, and a total of three support shafts 52 manufactured through another manufacturing process are prepared, respectively. It should be noted that in FIG. 11, one planetary gear 50 and one support shaft 52 are shown for ease of understanding.

Next, as indicated by the arrow A1 in FIG. 8, the planetary gear 50 is arranged to face the communication hole 62*a* from the radially outer side of the carrier 60. At this time, the third and fourth ball bearings BB3 and BB4 (see FIG. 3) are mounted in advance on the radially inner side of the planetary gear 50. In addition, the first washer WS1 is attached to each of the third and fourth ball bearings BB3 and BB4 (see FIG. 3).

Thereafter, the planetary gear 50 is inserted into the communication hole 62*a*, and the support shaft 52 is arranged to face the other axial side of the carrier 60, as indicated by the arrow A2 in FIG. 11. At this time, the input side cylindrical portion 65 of the carrier 60 is arranged on one axial side (lower side in the drawing), and the output side cylindrical portion 66 of the carrier 60 is arranged on the other axial side (upper side in the drawing).

Then, the support shaft 52 is inserted into the second support shaft fixing hole 64*b* and the first support shaft fixing hole 64*a* in this order. It should be noted that the support shaft 52 is inserted into the first support shaft fixing hole 64*a*, and the support shaft 52 is press-fitted into the second support shaft fixing hole 64*b*. Thus, the insertion load of the support shaft 52 does not need to be so large, and the carrier assembly CA can be easily assembled.

Thereafter, the work of attaching the planetary gear 50 to the communication hole 62*a* as described above is carried out twice in succession, thereby completing the work of assembling the carrier assembly CA (see FIG. 12).

[Assembling of the Internal Gear to the Carrier Assembly]

Next, as shown in FIG. 12, the internal gear 40 manufactured through another manufacturing process is prepared, and the work of assembling the internal gear 40 to the completed carrier assembly CA is carried out.

Specifically, the internal gear 40 is arranged to face the other axial side of the carrier assembly CA, that is, the side of the output side cylindrical portion 66 (upper side in the drawing), as indicated by the arrow A3 in the drawing. At this time, the side of the fourth flange portion 42 in the axial direction of the internal gear 40 is directed toward the carrier assembly CA.

Then, the internal gear 40 is disposed to cover the radially outer side of the carrier assembly CA. At this time, the planetary gear 50 of the carrier assembly CA is smoothly rotatable with respect to the carrier 60. Therefore, the internal teeth 43*a* of the internal gear 40 and the meshing recesses 51*a* of the planetary gear 50 mesh smoothly with each other.

Thereby, the work of assembling the internal gear 40 to the carrier assembly CA is completed.

[Assembling of the Housing Body and the Ring Member]

Next, as shown in FIG. 13, the housing body 21, the ring member 22, and the third washer WS3 manufactured through another manufacturing process are prepared. It should be noted that the first ball bearing BB1 is installed in advance in the housing body 21, and the second ball bearing BB2 is installed in advance in the ring member 22.

Thereafter, the third washer WS3 is attached to the output side cylindrical portion 66 of the carrier 60, as indicated by the arrow A4 in the drawing. Next, as indicated by the arrow A5 in the drawing, the housing body 21 is mounted so as to cover the radially outer side of the internal gear 40. At this time, the side of the first flange portion 21*b* of the housing body 21 in the axial direction is directed toward the internal gear 40.

Thereafter, the ring member 22 (second ball bearing BB2) is mounted on the input side cylindrical portion 65 of the carrier 60, as indicated by the arrow A6 in the drawing. At this time, the side of the ring member 22 on which the positioning protrusions P are provided faces the internal gear 40. Then, while the second ball bearing BB2 is attached to the input side cylindrical portion 65, the positioning protrusions P of the ring member 22 are engaged with the engagement recesses (not shown) of the internal gear 40.

Then, while a fixing bolt (not shown) is inserted into the insertion hole 21*c* of the first flange portion 21*b* and the insertion hole 42*a* of the fourth flange portion 42, the fixing bolt is screwed into the female screw hole 22*c* of the third flange portion 22*b*. Thereby, the speed reducer SD is housed inside the housing 20, and the assembly of the housing body 21 and the ring member 22 is completed.

[Assembling of the Pinion Gear and the Rattling Adjustment Mechanism]

Next, as shown in FIG. 14, the rotating shaft 31 having the pinion gear 30 and the lid member 67 manufactured through another manufacturing process are prepared. It should be noted that the fifth ball bearing BB5 is fixed to the rotating shaft 31 in advance. In addition, the second washer WS2, the sixth ball bearing BB6, and the rattling adjustment member 68 for forming the rattling adjustment mechanism BA are also prepared.

Thereafter, the pinion gear 30 is arranged to face the input side cylindrical portion 65 (see FIG. 3) of the carrier 60, as indicated by the arrow A7 in the drawing. Then, the pinion gear 30 is inserted among a total of three planetary gears 50 (see FIG. 8). At this time, the planetary gears 50 are smoothly rotatable with respect to the carrier 60. Therefore, while the planetary gears 50 rotate, the spiral tooth 32 of the pinion gear 30 and the meshing recesses 51*a* (see FIG. 8) of the planetary gears 50 mesh smoothly with each other.

Then, the outer ring OR5 of the fifth ball bearing BB5 is installed in the bearing fixing portion 65*c* of the insertion hole 65*a* (see FIG. 5). Further, as indicated by the arrow A8 in FIG. 14, the lid member 67 is fixed to the input side cylindrical portion 65 (see FIG. 3). At this time, a total of three fixing screws (not shown) are inserted into the screw insertion holes 67*a* of the lid member 67 and screwed into the screw holes 65*b* (see FIG. 3) of the input side cylindrical portion 65.

Thereby, the outer ring OR5 of the fifth ball bearing BB5 is fixed to the bearing fixing portion 65*c*, and the rotating shaft 31 (pinion gear 30) is prevented from coming out of the carrier 60.

Next, as indicated by the arrow A9 in the drawing, the second washer WS2 is inserted into the bearing support portion 66*a* of the output side cylindrical portion 66, and the second washer WS2 is placed on the support step 31*b* of the rotating shaft 31. Following this, the sixth ball bearing BB6 is inserted into the bearing support portion 66*a* of the output side cylindrical portion 66, and the inner ring IR6 is mounted on the bearing mounting portion 31*a* of the rotating shaft 31. Then, the rattling adjustment member 68 is screwed to the female screw portion 66*d* of the bearing support portion 66*a*.

Thereby, one axial side (the side of the fifth ball bearing BB5) of the inner ring IR6 of the sixth ball bearing BB6 is supported by the support step 31*b* via the second washer WS2. Further, the other axial side (the side of the rattling adjustment member 68) of the outer ring OR6 of the sixth ball bearing BB6 is supported by the pressing portion 68*b* of the rattling adjustment member 68.

Thereafter, as indicated by the arrow A10 in FIG. 4 and FIG. 14, the rattling adjustment member 68 is turned clockwise with predetermined tightening torque. Then, the rattling adjustment member 68 moves to one axial side (the side of the rotating shaft 31), and the sixth ball bearing BB6 also moves to one axial side. Specifically, the outer ring OR6 is pressed to one axial side by the pressing portion 68*b*. As a result, the outer ring OR6 is moved in the direction of the arrow M1 in FIG. 4.

Further, as the outer ring OR6 moves in the direction of the arrow M1, the inner ring IR6 of the sixth ball bearing BB6 is also moved in the direction of the arrow M2 (see FIG. 4), which is in the same direction as the outer ring OR6. During this time, the rattling of the sixth ball bearing BB6 is absorbed (removed).

Then, since the inner ring IR6 presses the support step 31*b* to one axial side via the second washer WS2, the rotating shaft 31 is also pressed to one axial side, as indicated by the arrow M2 in FIG. 5. At this time, the rattling among the inner ring IR6, the second washer WS2, and the pinion gear 30 in the axial direction of the rotating shaft 31 is also removed.

Thereafter, as the rotating shaft 31 moves to one axial side, the inner ring IR5 of the fifth ball bearing BB5 fixed to the rotating shaft 31 is moved to one axial side, as indicated by the arrow M3 in FIG. 5.

Further, as the inner ring IR5 moves in the direction of the arrow M3, the outer ring OR5 of the fifth ball bearing BB5 is also moved in the direction of the arrow M4 (see FIG. 5), which is in the same direction as the inner ring IR5. Then, the outer ring OR5 is abutted against the lid member 67 from the other axial side. During this time, the rattling of the fifth ball bearing BB5 is absorbed (removed).

By turning the rattling adjustment member 68 clockwise with the predetermined tightening torque in this way, the rattling of the fifth and sixth ball bearings BB5 and BB6 is removed, and the rattling of the outer ring OR5 of the fifth ball bearing BB5 with respect to the bearing fixing portion 65*c* is also removed. Therefore, the rotating shaft 31 does not rattle in the axial direction with respect to the carrier 60.

However, if the tightening torque of the rattling adjustment member 68 is too large, the rotational resistance of the fifth and sixth ball bearings BB5 and BB6 increases. Therefore, the tightening torque of the rattling adjustment member 68 is set so as not to exceed the allowable axial force of the fifth and sixth ball bearings BB5 and BB6.

Thus, the work of assembling the pinion gear 30 and the rattling adjustment mechanism BA is completed, and the rattling of the rotating shaft 31 in the axial direction with respect to the carrier 60 (planetary gear reduction mechanism 10) is removed. Therefore, the assembly work of the planetary gear reduction mechanism 10 is finally completed.

The transmission efficiency [%] of the pinion gear 30 and the planetary gear 50 with respect to the rotational drive of the rotating shaft 31 in the forward and reverse directions was as shown in the graph of FIG. 15. In other words, in the case where the rotating shaft 31 rattled in the axial direction, that is, in the case of the "Comparative Example" where rattling occurred, there was a relatively large difference in transmission efficiency [%] between the clockwise direction (broken line arrow CW) and the counterclockwise direction (solid line arrow CCW). This means that the output characteristics of the planetary gear reduction mechanism 10 change relatively largely depending on the rotation direction of the rotating shaft 31. Therefore, there may be a problem that the technique is not suitable for driving the joints of a robot that requires precise drive control.

In contrast thereto, in the case where the rotating shaft 31 did not rattle in the axial direction, that is, in the case of "this embodiment" where there was no rattling, the transmission efficiency [%] was close to each other in the clockwise direction (broken line arrow CW) and the counterclockwise direction (solid line arrow CCW), compared to the "Comparative Example". Specifically, the difference in transmission efficiency [%] was able to be reduced to approximately half or less, compared to the "Comparative Example". Thus, the output characteristics of the planetary gear reduction mechanism 10 are prevented from changing largely depending on the rotation direction of the rotating shaft 31, and stable operation becomes possible. Therefore, it is possible to sufficiently cope with the drive of the joints of a robot that requires precise drive control.

Furthermore, in the planetary gear reduction mechanism 10, as described above, the pinion gear 30 is provided with only one spiral tooth 32, and the cross-sectional shape of the spiral tooth 32 is substantially semicircular. Therefore, when the planetary gear reduction mechanism 10 operates, each planetary gear 50 tends to separate from the pinion gear 30 with a relatively strong force. That is, the pinion gear 30 is likely to cause a rotational shake.

In contrast thereto, in the planetary gear reduction mechanism 10, as described above, the pinion gear 30 is supported by the fifth and sixth ball bearings BB5 and BB6 that have relatively high rigidity so a rotational shape of the pinion gear 30 can be effectively suppressed. Accordingly, the planetary gear reduction mechanism 10 is capable of stable operation even under a relatively large load (large torque).

As detailed above, the planetary gear reduction mechanism 10 of this embodiment includes the fifth ball bearing BB5 that is provided on one side of the pinion gear 30 in the axial direction of the rotating shaft 31 and rotatably supports the rotating shaft 31, the sixth ball bearing BB6 that is provided on the other side of the pinion gear 30 in the axial direction of the rotating shaft 31 and rotatably supports the rotating shaft 31, the bearing fixing portion 65*c* that is provided on the carrier 60 and supports the fifth ball bearing BB5 immovably in the axial direction of the rotating shaft 31, and the bearing guide portion 66*c* that is provided on the carrier 60 and supports the sixth ball bearing BB6 movably in the axial direction of the rotating shaft 31. The fifth ball bearing BB5 and the sixth ball bearing BB6 are provided so as not to be close to each other in the axial direction of the rotating shaft 31, and the female screw portion 66*d* is provided with the rattling adjustment member 68 that presses the sixth ball bearing BB6 toward the side where the fifth ball bearing BB5 is provided.

Thus, through adjustment of the rattling adjustment member 68, the rattling of the fifth and sixth ball bearings BB5 and BB6 can be removed, and the rattling of the fifth ball bearing BB5 with respect to the bearing fixing portion 65*c* can be removed as well. Therefore, the rotating shaft 31 can be prevented from rattling in the axial direction with respect to the carrier 60, thereby optimizing the transmission efficiency [%] of the gears. Thus, the planetary gear reduction mechanism 10 capable of stable operation can be realized.

Moreover, according to the planetary gear reduction mechanism 10 of this embodiment, the fifth ball bearing BB5 includes the inner ring IR5 and the outer ring OR5, the inner ring IR5 is fixed to the rotating shaft 31, and the outer ring OR5 is supported by the bearing fixing portion 65*c*.

Thereby, the rattling in the axial direction of the fifth ball bearing BB5 can be removed simply by adjusting the rattling adjustment member 68 and applying an axial force to the rotating shaft 31.

Furthermore, according to the planetary gear reduction mechanism 10 of this embodiment, the sixth ball bearing BB6 includes the inner ring IR6 and the outer ring OR6, one axial side of the inner ring IR6 is supported by the support step 31*b* provided on the rotating shaft 31, and the other axial side of the outer ring OR6 is supported by the pressing portion 68b of the rattling adjustment member 68.

Thereby, the rattling in the axial direction of the sixth ball bearing BB6 can be removed simply by adjusting the rattling adjustment member 68 and applying an axial force to the outer ring OR6.

Further, according to the planetary gear reduction mechanism 10 of this embodiment, the rattling adjustment member 68 is screwed to the female screw portion 66d of the bearing support portion 66a.

Thereby, the rattling of the fifth and sixth ball bearings BB5 and BB6 and the rattling of the fifth ball bearing BB5 with respect to the bearing fixing portion 65c can be easily removed (improved workability) simply by managing the screwing amount of the rattling adjustment member 68 (managing the tightening torque).

Furthermore, according to the planetary gear reduction mechanism 10 of this embodiment, both axial sides of the planetary gear 50 are supported by the third and fourth ball bearings BB3 and BB4, respectively.

Thereby, the rattling of the planetary gear 50 with respect to the carrier 60 can be effectively suppressed, which also optimizes the transmission efficiency [%] of the gears and thus realizes the planetary gear reduction mechanism 10 capable of more stable operation.

Further, according to the planetary gear reduction mechanism 10 of this embodiment, the pinion gear 30 has only the spiral tooth 32 that is spirally connected in the axial direction of the rotating shaft 31.

Thereby, the transmission efficiency [%] of the gears can be increased and a large reduction ratio can be obtained despite the small size. Therefore, it is possible to downsize and save power of the electric motor which is a drive source.

Moreover, according to the planetary gear reduction mechanism 10 of this embodiment, the dimensional errors of the parts that differ from product to product can be absorbed through adjustment of the rattling adjustment member 68, thereby optimizing the transmission efficiency [%] of the gears for each product. Therefore, the management of parts can be simplified and the work such as reassembly can be eliminated. Thus, the manufacturing energy for manufacturing the planetary gear reduction mechanism 10 can be saved, and particularly Goal 7 (ensure access to affordable, reliable, sustainable and modern energy for all) and Goal 13 (take urgent action to combat climate change and its impacts) in the United Nations Sustainable Development Goals (SDGs) can be achieved.

It goes without saying that the disclosure is not limited to the embodiments described above, and can be modified in various ways without departing from the spirit thereof. For example, in the embodiments described above, the first and second ball bearings BB1 and BB2 are provided between the housing 20 and the carrier 60, but the disclosure is not limited thereto, and bushes or bearings also called metals can also be used instead of the first and second ball bearings BB1 and BB2 (for cost reduction).

Further, in the embodiments described above, a total of three planetary gears 50 are provided, but the disclosure is not limited thereto, and four or more planetary gears 50 may be provided. It should be noted that if there are two planetary gears 50 (an even number), the planetary gears 50 are arranged 180 degrees opposite each other, which makes it difficult to hold the pinion gear 30 in a well-balanced manner and results in an increase in operating noise and a decrease in transmission efficiency [%]. On the other hand, if there are five or more planetary gears 50, the assemblability may be impaired or the structure may become larger. Therefore, when used in applications such as the above-described embodiments, it is desirable that the number of planetary gears 50 is three (an odd number).

Furthermore, it goes without saying that the above-described assembly procedure of the planetary gear reduction mechanism 10 is merely one example of many assembly procedures, and other assembly procedures may be used as well. For example, "assembling of the pinion gear 30 and the rattling adjustment mechanism BA" shown in FIG. 14 may also be performed before "assembling of the housing body 21 and the ring member 22" shown in FIG. 13.

In addition, the material, shape, size, number, installation location, etc. of each component in the above-mentioned embodiments are arbitrary as long as the disclosure can be achieved, and are not limited to the above-mentioned embodiments.

What is claimed is:

1. A planetary gear reduction mechanism, comprising:
   a sun gear provided on a rotating shaft;
   an internal gear arranged on a radially outer side of the sun gear;
   a planetary gear arranged between the sun gear and the internal gear;
   a planetary carrier rotatably supporting the planetary gear;
   a first bearing provided on one side of the sun gear in an axial direction of the rotating shaft and rotatably supporting the rotating shaft;
   a second bearing provided on the other side of the sun gear in the axial direction of the rotating shaft and rotatably supporting the rotating shaft;
   a first bearing support portion provided on the planetary carrier and supporting the first bearing immovably in the axial direction of the rotating shaft;
   a second bearing support portion provided on the planetary carrier and supporting the second bearing movably in the axial direction of the rotating shaft; and
   a pressing member disposed in the second bearing support portion and configured to press the second bearing toward a side where the first bearing is provided;
   wherein the first bearing and the second bearing are provided so as not to be close to each other in the axial direction of the rotating shaft.

2. The planetary gear reduction mechanism according to claim 1, wherein the first bearing comprises a first inner ring and a first outer ring,
   the first inner ring is fixed to the rotating shaft, and
   the first outer ring is supported by the first bearing support portion.

3. The planetary gear reduction mechanism according to claim 1, wherein the second bearing comprises a second inner ring and a second outer ring,
   one axial side of the second inner ring is supported by a stepped portion provided on the rotating shaft, and
   the other axial side of the second outer ring is supported by the pressing member.

4. The planetary gear reduction mechanism according to claim 1, wherein the pressing member is screwed to the second bearing support portion.

5. The planetary gear reduction mechanism according to claim 1, wherein both axial sides of the planetary gear are respectively supported by ball bearings.

6. The planetary gear reduction mechanism according to claim 1, wherein the sun gear comprises only one tooth spirally connected in the axial direction of the rotating shaft.

* * * * *